No. 665,748. Patented Jan. 8, 1901.
C. R. MOHR & J. H. ELLIS.
DRAFT EQUALIZER.
(Application filed Aug. 11, 1900.)

(No Model.)

Witnesses

Inventor
C. R. Mohr
J. H. Ellis
By Attorneys

UNITED STATES PATENT OFFICE.

CYRUS R. MOHR AND JAMES H. ELLIS, OF ASSUMPTION, ILLINOIS.

DRAFT-EQUALIZER.

SPECIFICATION forming part of Letters Patent No. 665,748, dated January 8, 1901.

Application filed August 11, 1900. Serial No. 26,626. (No model.)

*To all whom it may concern:*

Be it known that we, CYRUS R. MOHR and JAMES H. ELLIS, citizens of the United States, residing at Assumption, in the county of Christian and State of Illinois, have invented certain new and useful Improvements in Draft-Equalizers; and we do hereby declare the following to be a full, clear, and exact description of the invention, such as will enable others skilled in the art to which it appertains to make and use the same.

This invention relates to the class of devices to be applied to agricultural implements for equalizing the draft of horses unevenly distributed upon opposite sides of the pole or tongue.

Devices of the character aforesaid as generally constructed necessitate the animals pushing against the pole when turning the implement. The present contrivance obviates this objectionable feature and enables the animals to pull the machine or implement to which they are hitched around.

For a full description of the invention and the merits thereof and also to acquire a knowledge of the details of construction of the means for effecting the result reference is to be had to the appended description and the drawings hereto attached.

While the essential and characteristic features of the invention are necessarily susceptible of modification, still the preferred embodiment of the invention is illustrated in the accompanying drawings, in which—

Figure 1:
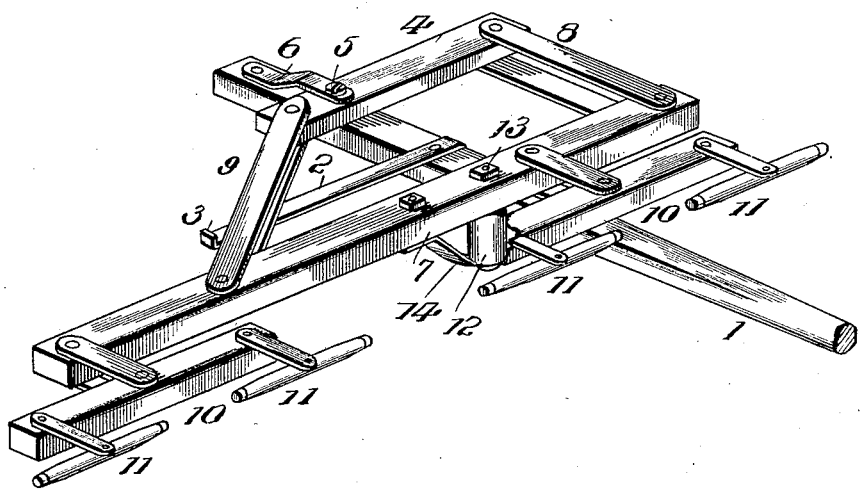
Figure 2:
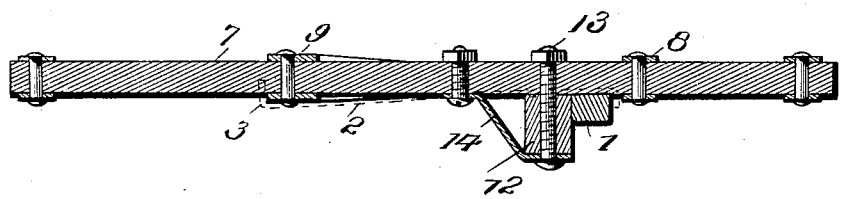

Figure 1 is a perspective view of a draft-equalizer embodying the essential features of this invention. Fig. 2 is a transverse section.

Corresponding and like parts are referred to in the following description and indicated in both the views of the drawings by the same reference characters.

The pole or tongue 1 is in practice attached to the frame of the implement in any substantial and desired way, and the parts comprising the equalizer are attached thereto substantially as hereinafter described and according as the implement operates right or left. An arm 2 is rigidly attached at its inner end to the pole or tongue a short distance in advance of its rear end and projects laterally and terminates in a hook or vertical extension 3. The primary purpose of the arm 2 is to support the heavy end of the evener-beam and attached parts, and incidental to this use the arm, by reason of its hooked terminal, enables the draft to be applied so as to draw the implement laterally in one direction to avoid a stump or other obstruction in the direct path of the machine.

The equalizing-lever 4 is pivotally connected to the rear portion of the pole by means of the bolt 5, and the latter is braced at its upper end by the hammer-strap 6. The evener-beam 7 in its normal position is approximately parallel with the equalizing-lever 4 and is of a floating character, since it has no positive connection with the pole or tongue, and is free to move in every direction to accommodate the strain of the load and draft. Links 8 and 9 connect the outer ends of the equalizing-lever 4 with the evener-beam 7 and are preferably composed of companion members embracing opposite sides of the parts to which they are pivotally attached. The links 8 are shorter than the links 9 and extend about parallel with the pole 1 and connect corresponding ends of the parts 4 and 7. The links 9 are inclined with reference to the pole 1 and line of draft and connect the outer end of the short arm of the equalizing-lever 4 with the evener-beam 7 at a point about midway between the pole 1 and the extremity of the long arm. The doubletrees 10, provided with singletrees 11, are connected to the evener-beam in such a manner as to admit of one horse being disposed upon one side of the pole and three horses upon the opposite side of the said pole.

From the foregoing it will be readily understood that the draft is applied directly to the evener-beam and from it to the pole or tongue by means of the links 8 and 9 and the equalizing-lever 4. The evener-beam being mounted so as to move freely in every direction, it is necessary to provide and attach a stop thereto to enable the direct application of the draft to the pole or tongue when it is required to turn the implement. The stop 12 is a roller, so as to reduce the friction between it and the pole to the smallest amount possible and obviate excessive wear of the engaging surfaces. The roller-stop 12 projects from the evener-beam across the path of the pole, so as to engage with a side thereof, and is mounted upon a bolt 13, which is braced by a strap 14. The relative position of the strap will depend upon the location of the parts comprising the equalizer, so as to adapt it for either a right-hand or a left-hand implement.

In practice the parts being assembled substantially as shown and four draft-animals hitched to the evener-beam, one upon one side of the pole and three upon the other side, the draft is equalized. When the evener-beam is pulled laterally in a direction to bring the stop 12 against the adjacent side of the pole 1, the latter is turned and the implement correspondingly drawn to one side, and a continued lateral draft will effect a turning of the implement, as will be readily understood, the pole being carried around by means of the stop 12 in engagement therewith. Upon the application of lateral draft to the evener-beam in an opposite direction the links 9 are brought in contact with the hooked terminal of the arm 2, thereby causing the pole 1 to move laterally and swerve the machine from a direct course, so as to avoid a stump, boulder, or other obstruction. The parts 12 and 3 are disposed so as to admit of a limited lateral play of the evener-beam without affecting the pole. The hook 3 constitutes, in effect, a stop, since it operates in substantially the same manner as the stop 12.

Having thus described the invention, what is claimed as new is—

1. In a draft-equalizer, and in combination with the pole or tongue, an equalizing-lever, an evener-beam, links connecting the equalizing-lever and evener-beam, and an arm rigidly attached at its inner end to the pole and projecting horizontally therefrom to engage with one of the links and support the heavy end of the evener-beam and attached parts, substantially as specified.

2. In a draft-equalizer, and in combination with the pole or tongue, an equalizing-lever pivotally connected with the said pole, a floating evener-beam, links connecting the equalizing-lever and evener-beam, and an arm rigidly attached to the pole and projecting laterally therefrom and having an extension at its outer end constituting a stop to engage with one of the links to admit of a positive application of the draft for turning the implement, substantially as specified.

3. In a draft-equalizer, and in combination with the pole or tongue, an equalizing-lever pivotally connected to the pole, a floating evener-beam, links connecting the equalizing-lever and evener-beam, a roller-stop applied to the evener-beam and adapted to bear laterally against a side of the pole, and an arm rigidly attached to the pole and projecting horizontally therefrom to engage with one of the aforesaid links to support the heavy end of the evener-beam and provided at its outer end with an extension constituting a stop, substantially as and for the purpose set forth.

In testimony whereof we affix our signatures in presence of two witnesses.

CYRUS R. MOHR. [L. S.]
  JAMES H. ELLIS. [L. S.]

Witnesses:
 MAURICE FRIEND,
 BARTHOLOMEW FITZE.